UNITED STATES PATENT OFFICE.

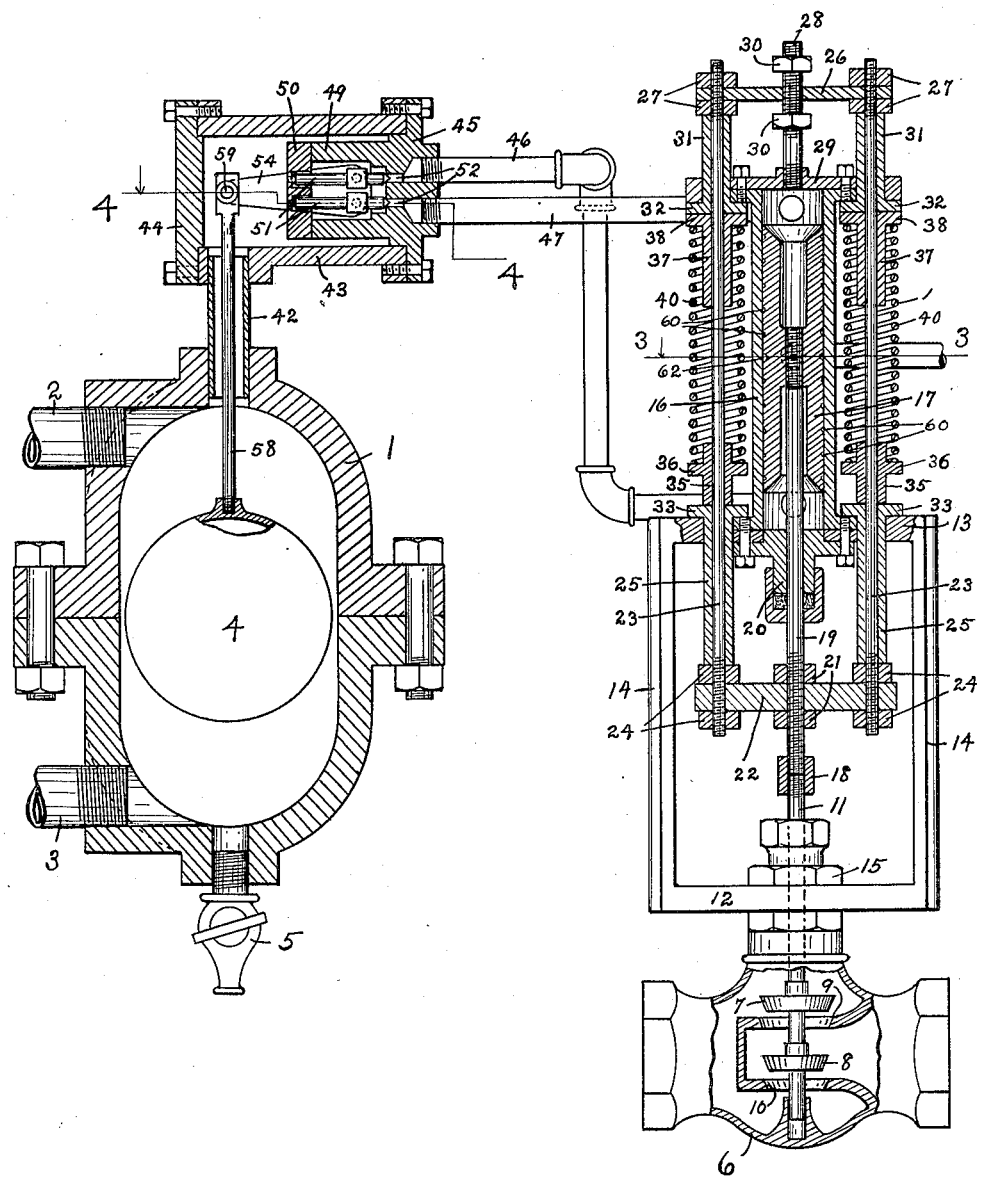

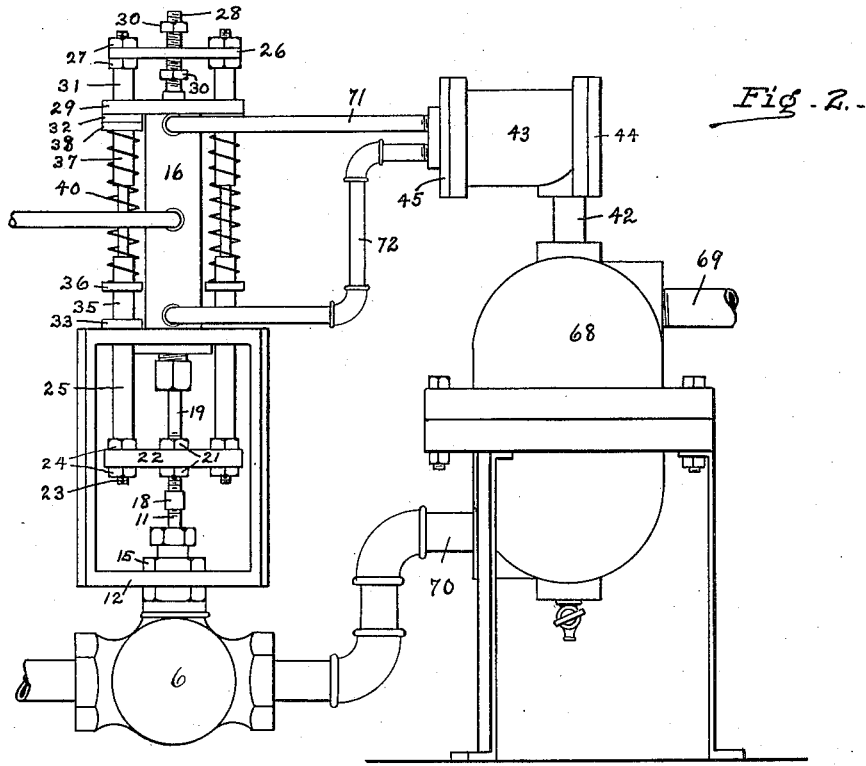
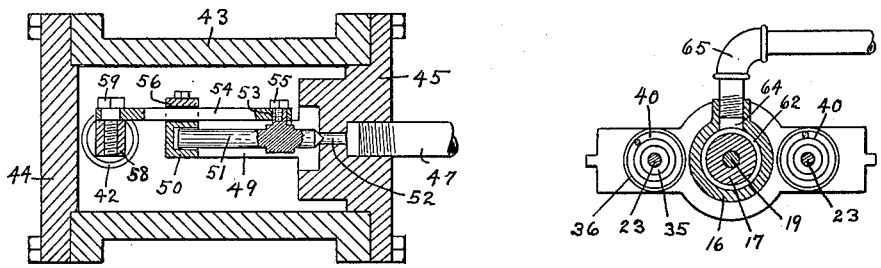

WILLIAM MENNIE, OF DETROIT, MICHIGAN.

VALVE-CONTROLLER.

1,091,945.          Specification of Letters Patent.     Patented Mar. 31, 1914.

Application filed January 18, 1912, Serial No. 671,932. Renewed July 2, 1913. Serial No. 777,097.

*To all whom it may concern:*

Be it known that I, WILLIAM MENNIE, a citizen of the Dominion of Canada, and a resident of Detroit, in the county of Wayne and State of Michigan, have invented a new and useful Valve-Controller, of which the following is a specification.

This invention relates to means for regulating the flow of fluids, such as air, steam, gas, and liquids through valves by means of devices which, in turn, are controlled by the height of liquids in closed receptacles; and the object of this invention is to provide means for moving a valve in either direction from normal position, so that the opening controlled thereby may be increased or diminished, and that thereby the flow of fluids, whether they be liquids or gases, may be positively controlled.

This invention consists in combination with a valve for controlling the flow of fluids, of a novel actuating device for said valve comprising a piston, a cylinder in which the same is movable, pipes leading to the opposite ends of said cylinder, novel valves for regulating the flow of fluids to the ends of said cylinder, means for actuating said valves, together with novel means for returning the main controlling valve to normal position.

In the accompanying drawings Figure 1 is a vertical section of the novel valve-controlling mechanism. Fig. 2 is an elevation of this mechanism arranged to act as a water-trap. Fig. 3 is a section on the line 3—3 of Fig. 1. Fig. 4 is a section on the line 4—4 of Fig. 1.

Similar reference characters refer to like parts throughout the several views.

As will be seen in Fig. 1, 1 is a small chamber which may connect by means of the pipes 2 and 3 to any large container of liquids. These pipes will connect to a steam boiler above and below the desired water-level when this device is used to regulate the flow of feed water to said boiler. This ball-chamber 1, the float 4 and the drain-cock 5 are all of well known construction. It may be assumed that the desired height of water will be at the line of connection of the two parts of the ball-chamber.

The controlling valve 6 is of well known design and is preferably formed with two valves 7 and 8 on a stem 11, which valves have seats 9 and 10. As these valves are nearly the same size, they will be almost balanced, and will require but little force to lift them off their seats or to force them down onto their seats, depending upon the direction of the flow of the fluids through said valve. A frame, consisting of cross-bars 12 and 13 and side-bars 14, is mounted on the bonnet of the valve and held in position by a nut 15. This frame carries a cylinder 16, in which is slidable a piston 17. A coupling 18 connects the valve-stem 11 to the piston rod 19, while a stuffing box 20 prevents leakage around the piston rod.

Secured in position on the piston rod by means of the nuts 21 is a cross-bar 22, to which the lower ends of the vertical rods 23 are connected by means of the nuts 24. These rods 23 are slidable in the sleeves 25 which are, in turn, slidable upwardly in the cross-bar 13. At the upper end of these rods 23 is secured a cross-bar 26 by means of the nuts 27. A stem 28 is connected to the cylinder-head 29, and carries nuts 30 which limit the longitudinal movements of the rods 23. Sleeves 31 are mounted on the upper ends of the rods 23 and are slidable downwardly in proper passages formed in the cylinder-head 29. The sleeves 31 have circular flanges 32 at their lower ends, while the sleeves 25 have similar flanges 33 at their upper ends.

Mounted on the rods 23 are thimbles 35 having flanges 36 at any desired distance from their lower ends, while near the upper ends of these rods 23 are other thimbles 37, also formed with flanges 38. Between the flanges 36 and 38 are the springs 40. It will be readily seen that by merely substituting thimbles having flanges similar to flanges 36 and 38, but at different distances from their outer ends, the tension of the springs 40 can be readily increased or decreased.

A short tube 42 connects to the upper end of the chamber 1 and into a cylinder 43, which has heads 44 and 45. Into the head 45 are connected the pipes 46 and 47, the former of which connects to the lower end of the cylinder, while the latter connects to the upper end. Extending inwardly from the head 45 is a flat valve chamber 49, having a plate 50 secured to its rear end. In small guide holes in the cap 50 are mounted the rear ends of the valves 51 shown in Fig. 4, each formed with a pointed front end adapted to close a passage 52, and with a lateral, cylindrical projection 53 which is journaled in a proper hole in the plate 54.

A screw 55 in each projection 53 holds the plate in position. A guide-bar 56 may be secured to the side of the cap 50 to prevent lateral movement of the plate 54. A stem 58 connects to the outer end of this plate 54 by means of a pin 59, and its lower end screws into the ball 4.

The operation of this mechanism is as follows: When the ball is in the position shown in the drawing, the plate 54 will be central and both valves 51 will be on their seats, preventing the flow of the steam or other fluids in the ball chamber 1 above the liquid in said chamber into either pipe 46 or 47. The springs 40 will hold the thimbles 35 and 37 against the flanges 32 and 33, and these flanges against the cylinder-head 29 and cross-bar 13 respectively. The valve disks 7 and 8 will be held in their normal position as shown in Fig. 1. If the level of the liquid in the chamber 1 falls, the ball will fall with it, and the outer end of the plate 54 will descend and turn on the cylindrical projection 53 of the lower valve 51 as a pivot, and move the upper valve 51 from its seat. The steam or other fluid in the chamber 1 and cylinder 43 will rush through the pipe 46 to the lower end of the cylinder 16 and cause the piston 17 to move upwardly, lifting the valves 7 and 8 farther from their seats, so that more fluid can pass through the valve 6. The valves 7 and 8 will remain in their outward position so long as pressure exists in the lower end of the cylinder 16. When the liquid in the chamber 1 rises sufficiently to bring the ball to its normal height, then the upper valve 51 will be permitted to seat itself and the pressure in the pipe 46 and in the lower end of the cylinder 16 will fall, and the springs 40 will be permitted to force the valves 7 and 8 back to their normal position. If the water rises too high in the chamber 1, the ball 4 will swing up the plate 54, causing the lower valve 51 to be forced from its seat and permitting the flow of the fluid through the pipe 47 to the upper end of the cylinder, which will result in the piston 17 being forced down against the pressure of the springs 40, and the valves 7 and 8 being forced down onto their seats. This will stop the flow through the valve 6. In case both valves 51 should be off their seats when the ball 4 moves from neutral position, then at the beginning of movement of the plate 54, one of the valves 51 will engage the plate 50 with its outer end and the other valve will be forced to its seat.

It will be noticed that the piston 17 is provided with a number of circumferential grooves 60, which increase in depth and size from the ends to the middle, which grooves will be filled with lubricants. The steam or other fluid slowly passes the piston to the deep groove 62 from either end, and flows around the piston through this groove to the opening 64 and waste-pipe 65. The piston is so made that this flow will be very slow, but will be sufficient to relieve the pressure on the ends of the piston when the valves 51 are seated. Thus this escape acts as the exhaust.

As stated before, this valve 6 may be employed to control the flow of fluids of all kinds, including steam and water. This valve may therefore be employed to control the flow of steam to the feed-pump of a boiler, to that the height of the water in the boiler will automatically control the operation of the pump. The valve may also be employed to control the flow of the feed-water to the boiler where said water is obtained under pressure. In Fig. 2 a slightly different installation is illustrated and may be used as a water-trap in a steam heating-system. The cylinder 43 and the ball-chamber 68 are of the same construction as before stated, and the valve 6 and the controlling mechanism are also built as before set forth. The pipe 69 is a main drain-pipe of the heating-system, and discharges into the chamber 68. The pipe 70 connects to the valve 6. The pipe 71 connects to the upper end of the cylinder 16, while the pipe 72 connects to the lower end of the cylinder.

As in some steam heating-systems, a pressure exists in the chamber 68 above the water, and will therefore be found also in the cylinder 43. So long as the condensation in the system is regulated by the valves 7 and 8 when in their normal position, no movement of the control apparatus occurs, but when the water falls below the predetermined level, the upper valve 51 is opened and the valves 7 and 8 are forced down to their seats, thus preventing the flow of steam directly from the pipe 69 through the chamber 68 to the pipe 70. If the water in the chamber 68 rises too high, the lower valve 51 will be opened, and steam will flow to the lower end of the cylinder 16, causing the valves 7 and 8 to be moved farther from their seats, and thus giving the valve 6 greater capacity. It will thus be seen that very close control of the flow of the fluids through the valve 6 is obtained by this mechanism. The various parts must be properly proportioned for the capacity of the valve 6, and the details of construction may all be changed to suit the requirements of the different conditions under which the mechanism is to be installed. By adjusting the nuts 21 on the piston rod, the normal capacity of the valve 6 can be accurately predetermined. These traps may be used on any steam pressure service.

It will be noticed that the piston 17 is formed with a conical bore at its upper end and a cylindrical chamber below said bore. Should any small particles of gritty matter be carried into this cylinder by the operating fluid, they will either fall into this receptacle in the piston, or, if they should happen to adhere to the inner wall of the cylinder, they will be scraped off by the sharp edges of the piston. In a similar manner the lower end of the piston is given a sharp edge, so that, should any particles adhere to the wall of the cylinder at the lower end, they will also be scraped off by the piston. At proper intervals the structure can be taken apart and cleaned.

Many changes in the details of construction and the proportions of the parts may be made by designers without departing from the spirit of my invention as set forth in the claims. Thus the piston rod 19 might be connected to any other proper mechanism having one normal and two abnormal positions.

I claim—

1. In a controlling device, the combination of a main valve and a stem therefor, a cylinder mounted adjacent the valve, a piston connected to said valve and mounted in said cylinder, resilient means to hold the valve partially open, a casing having two valve seats, pipes extending from said seats to the ends of said cylinder, a guide plate mounted in the case and having bores extending partially through it, valves mounted in said casing, each having one end in a bore in the plate and the other end adjacent a valve seat, a lever pivoted to both of said valves, and a float connected to said lever, the pivotal connection between each valve and the lever serving as a fulcrum for said lever when the rear end of the valve is seated in the bottom of its bore in the plate so that the other valve may be forced to its seat.

2. In a controlling device, the combination of a cylinder, a piston therein, a piston rod, a cross-bar adjustably mounted on said piston rod, rods connected to said cross-bar, flanged sleeves loosely mounted on said rods in pairs, a spring on each rod between said sleeves, means to cause the sleeves to move with said rods, and means to limit the movement of said sleeves.

3. In a controlling device, the combination of a valve, a stem therefor, a frame connected to said valve, a cylinder mounted on said frame, a head for the cylinder, a piston within the cylinder, a piston-rod connecting to said valve-stem, a cross-bar connected to said piston-rod, longitudinal rods extending from said cross-bar parallel to the piston and through said frame and cylinder head, sleeves mounted on the ends of said rods and having flanges to limit their outward movement, springs mounted on said rods between said sleeves, pipes leading to opposite ends of the cylinder, and means for controlling the flow of fluids through said pipes.

4. In a controlling device, the combination of a cylinder, a piston therein, a piston rod, a cross-bar connected to said piston rod, guides at the ends of the cylinder, sleeves in said guides extending outwardly and having flanges at their inner ends, rods slidable in said sleeves and connecting to said cross-bar, flanged thimbles on said rods adjacent the sleeves, and springs on said rods and engaging said flanges of the thimbles.

5. In a controlling device, the combination of a valve body having a seat, a valve and a valve stem, a cylinder mounted adjacent said valve body, a piston slidable in said cylinder and connected to said valve stem to move said valve from its seat, said piston having a circumferential groove intermediate its ends, a casing having two valve seats, pipes extending from said valve seats to the ends of said cylinder, valves mounted in said casing, a lever pivoted to said valves, a float connected to said lever, and an exhaust pipe connected to said cylinder intermediate its ends whereby the steam which passes from the ends of the cylinder to the groove in said piston may escape.

In testimony whereof I have signed this specification in the presence of two subscribing witnesses.

WILLIAM MENNIE.

Witnesses:
 EDWARD N. PAGELSEN,
 HUGO W. KREINBRING.

Copies of this patent may be obtained for five cents each, by addressing the " Commissioner of Patents,
Washington, D. C."